United States Patent

[11] 3,620,359

| | | |
|---|---|---|
| [72] | Inventor | Charles A. Smith<br>New Holland, Pa. |
| [21] | Appl. No. | 862,155 |
| [22] | Filed | Sept. 24, 1969 |
| [45] | Patented | Nov. 16, 1971 |
| [73] | Assignee | Sperry Rand Corporation<br>New Holland, Pa. |

[54] BALER FEEDER FINGER HOLDER
13 Claims, 4 Drawing Figs.

[52] U.S. Cl. ........................................................ 198/223
[51] Int. Cl. ....................................................... B65g 25/08
[50] Field of Search........................................... 198/223;
100/189, 183; 184/105 R; 308/19, 115

[56] References Cited
UNITED STATES PATENTS
1,021,977  4/1912  Elsas .............................. 308/19

3,156,346  11/1964  McDuffie ..................... 198/223
3,464,347  9/1969   Morris........................... 198/223 X FOREIGN PATENTS
699,636  12/1964  Canada ....................... 100/189

Primary Examiner—Gerald M. Forlenza
Assistant Examiner—Jerold M. Forsberg
Attorneys—Joseph A. Brown, John C. Thompson, James J. Kennedy and George C. Bower ABSTRACT: The baler feeder finger holder has a tubular shaft rotatably mounted on a transverse shaft of a feeder carriage. Two sets of feeder finger plates are fixedly attached perpendicularly to the tubular member and have split finger sleeves welded to the plates supporting fingers by the clamping action of the plates under pressure of the fastening means through the plates. The tubular shaft has spaced bushings mounted on the carriage shaft and forms an annular lubricating chamber with the carriage shaft between the bushings.

INVENTOR
CHARLES A. SMITH
BY
George C. Bower
ATTORNEY

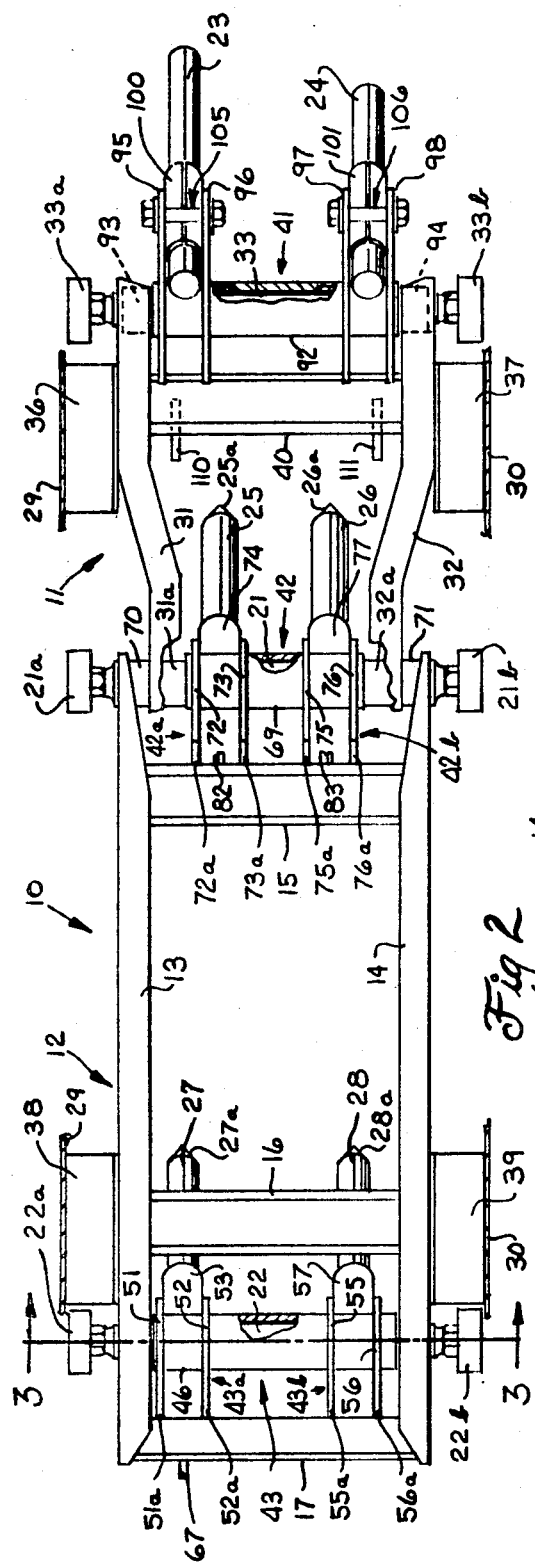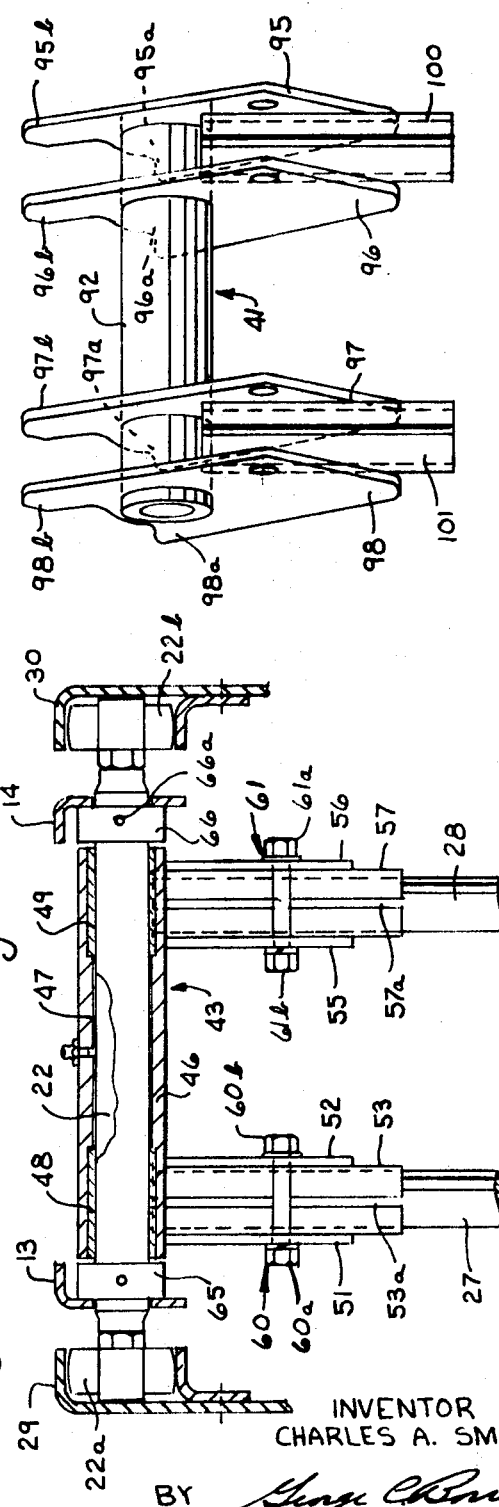

BALER FEEDER FINGER HOLDER

BACKGROUND OF THE INVENTION

This invention relates to the reciprocating feeder carriage of a baler and is directed particularly to the finger holders pivotally supporting the carriage fingers sweeping the crop material delivered to the baler into a bale case.

In one type baler the bale case forming the bale extends longitudinally to the direction of travel of the baler and the feeder receiving crop material from a pickup extends transversely to the direction of travel and sweeps the crop material into the bale case. The feeder has a reciprocating carriage with three sets of fingers. The fingers extend downwardly into the space receiving the crop material for sweeping the crop material on the forward stroke towards and into the bale case. On the return stroke the fingers are pivoted upwards by engaging the crop material so as to avoid moving the crop material away from the bale case.

In previous baler feeders the finger holder has been made of cast metal and has not been fully reliable or trouble free in operation. It has a bore to rotatably fit a holder on a carriage shaft and a finger bore to receive the cylindrical finger. The finger bore is variable in size by the casting being split along the bore and receiving a bolt with a nut to squeeze the sides of the split together. A projection extended from the other side of the finger holder for engaging a stop to properly locate the finger in a crop-material-feeding position. These finger holders have many disadvantages. The shaft bore is the bearing surface engaging the shaft. Lubricant is provided through an intermediately located passage terminating against the bearing surface rendering the passage susceptible to possible plugging. Also there is no reserve lubricant if the bearing surfaces become dry. In this type of structure an internal groove or reservoir adds to the cost of manufacture. With inadequate lubrication the entry of foreign material between the bearing surfaces is likely to occur further reducing the effectiveness of the lubricant. With the introduction of the lubricant the bearing surfaces can not be cleansed and foreign material removed. Also the shaft bore is too short which results in the overloading and rapid wear of the finger holder on the shaft. This combined with the inadequate lubrication often results in the premature failure of the holder to pivot freely on the shaft. The fingers then remain in the raised return position and do not sweep the crop material into the bale case. The enlargement of the casting to provide a larger bearing surface stiffens the casting so that the finger bore does not tightly grip the finger. The increased size also adds weight to the reciprocating carriage which is undesirable in view of the increased inertia in changing the direction of the carriage. In order to minimize the weight of the casting a single finger was held by each holder. This meant that fingers pivoting in side-by-side relation on the same shaft pivoted independently and the lowering of one finger does not lower the other finger. Another shortcoming was the failure of the carriage frame due to the striking of the heavy casting against the stop and to the forces created within the carriage by the weight of the cast holders.

The shortness of the bearing surfaces has been avoided by a single tubular casting having two finger mountings. Such a casting is expensive and still has the shortcoming of the lubricating passages becoming clogged and of the finger mountings being too stiff for a firm grasp of the fingers.

It is, therefore, desirable to provide a rotatably mounted and rugged feed finger holder that tightly grips spaced feed fingers and also has adequately lubricated bearing surfaces. It is further desirable to minimize the weight of the holder while improving its strength and to manufacture the holder by inexpensive methods.

OBJECTS AND SUMMARY OF THE INVENTION

An object of the invention is to provide a finger holder that maintains a proper lubrication between the finger holder and the supporting shaft and reduces the wear of the bearing surfaces of the shaft and finger holder without increasing the weight or cost of manufacture of the holder.

Another object of the invention is to provide a finger holder that securely grasps a finger.

Another object of the invention is to provide a finger holder that is strong and durable and securely holds the fingers without increasing the weight or expense of the manufacture of the holder.

Another object of the invention is to provide a finger holder that does not fatigue the carriage frame on receiving the repeated impact of the stop projection on the feed holder against the stoppings of the carriage.

In summary this invention is on a baler feeder finger holder comprising a tubular member with deformable finger sleeve means on platelike means extending from the tubular member with clamping means for tightening the grip of the sleeve means on feed finger means and with spaced bushing means rotatably mounted on a carriage shaft with a lubricant-receiving and supply chamber adjacent the bushing means.

Other and further objects and advantages of this invention will be apparent from the following specification and appended claims taken in connection with the drawings which illustrate a preferred embodiment of the invention.

BRIEF DESCRIPTION OF THE DRAWINGS

FIG. 2 is a top view of the carriage of FIG. 1.

FIG. 3 is a sectional view of the trailing finger holder.

FIG. 4 is a perspective view of the leading finger holder.

DETAILED DESCRIPTION OF A PREFERRED EMBODIMENT

Figure 1:
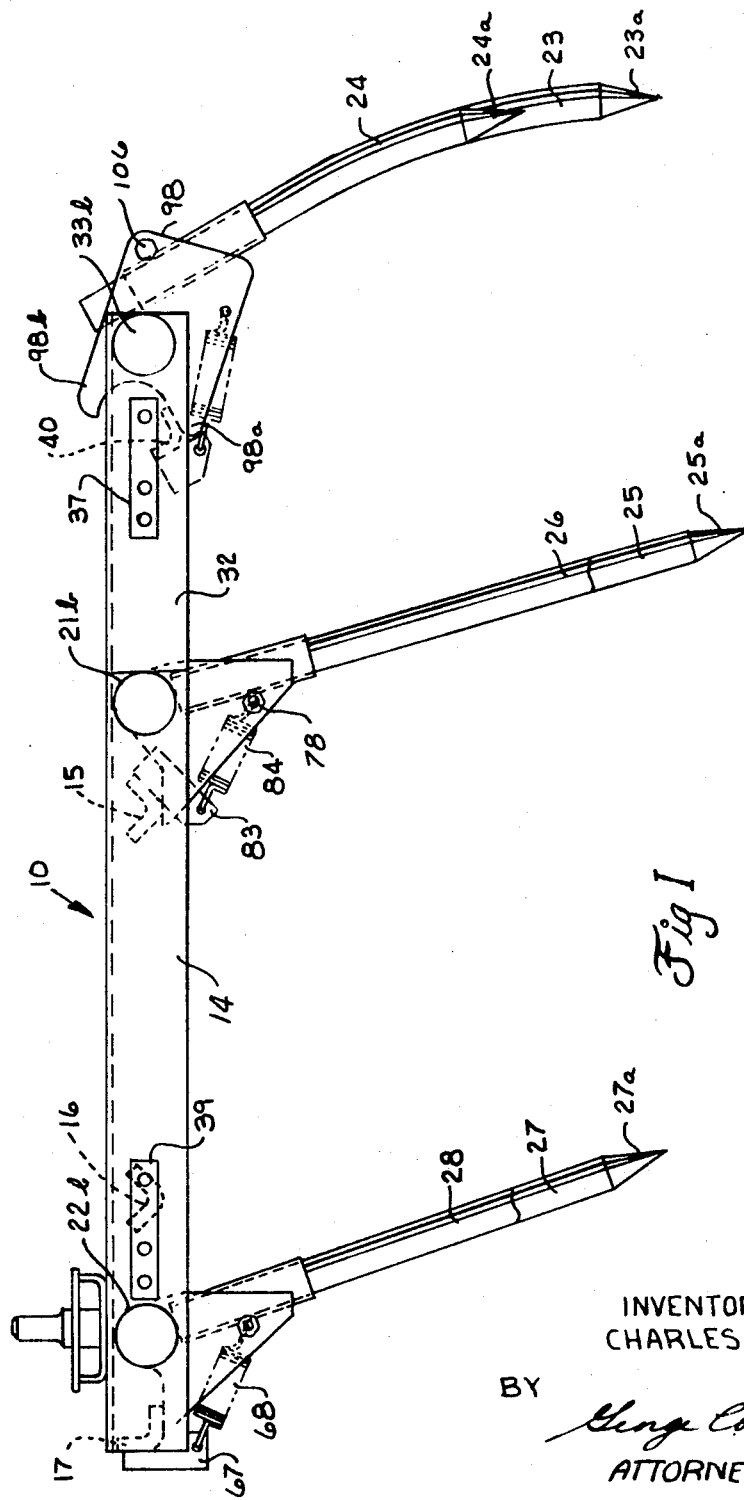
FIG. 1 is a side view of the carriage with the fingers in a downward crop-feeding position.

Referring to FIGS. 1 and 2 the carriage 10 comprises a leading portion 11 and a trailing portion 12 pivotally connected to permit the leading portion to follow a curved track. The leading portion pivotally carries the leading fingers 23, 24 and the trailing portion carries the intermediate fingers 25, 26 and the trailing fingers 27, 28. The trailing portion has side beams 13 and 14 of an angled or L-configuration. Between the side beams is a forward intermediate stop beam 15, a spacer beam 16 and a trailing stop beam 17 welded to the side beams to form the trailing portion of the carriage. At the forward end of the trailing portion an intermediate shaft 21 is mounted in the side beams in nonrotatable relation therewith and at the trailing end a trailing shaft 22 is mounted in the side beams in nonrotatable relation therewith. The intermediate shaft 21 has rollers 21a and 21b rotatably mounted thereon at the ends and the shaft 22 has rollers 22a, 22b rotatably mounted thereon. The rollers 21a, 21b, 22a, 22b, ride in rails 29, 30 (FIG. 3) supporting the carriage in a reciprocatory movement.

The leading carriage portion 11 has side beams 31 and 32 of an angle or L-shaped configuration rotatably mounted on the intermediate shaft 21. At the leading end, shaft 33 is mounted in the side beams 31, 32 in nonrotatable relation therewith and has rollers 33a and 33b rotatably mounted thereon. The rollers 33a, 33b also ride in the rails 29, 30. On the leading carriage portion 11 are thrust blocks 36, 37 and on the rearward end of the trailing portion 12 are thrust blocks 38, 39. The thrust blocks engage the sides of the rails for guiding the carriage. A lead stop beam 40 extends across the leading carriage portion and is fixedly secured to the side beams 31, 32.

The leading finger holder 41, the intermediate finger holder 42 and the trailing finger holder 43 are rotatably mounted on the shaft 33, 21 and 22, respectively. These three finger holders are basically the same. However, the finger holder 42 is shorter than the trailing finger holder 43. The finger holder 41 has differently shaped finger plates and the finger sleeves mounted in different position than the other two holders. Referring to FIG. 3 the trailing finger holder is illustrated in detail. The pivot tubular member 46 is cylindrical in shape and has a bore 47 recessed at the ends to receive bushings 48 and 49. The bore 47 is spaced from the shaft 22 by the bushings 48, 49 which rotatably support the trailing holder on the shaft 22. The space forms a lubricant chamber to receive lubricant through the fitting. The lubricant flows axially between the bushings 48 and 49 and the shaft 22. Since the lubricant chamber is at the inner end of the bushings 48, 49 it cannot become clogged with foreign debris and the flow of lubricant between the surfaces is opposite to the entry of any debris. Thus the accumulation between the bearing surfaces by foreign debris is eliminated and the surfaces are kept lubricated against excessive wear. The finger plates 51, 52 have the finger sleeve 53 welded thereto for holding the finger 27 and the finger plates 55, 56 at the other end of the pivot tubular member 46 have the finger sleeve 57 welded thereto for holding the finger 28. The plates 51, 52 and the plates 55, 56 are welded to the pivot tubular member at the bushings 48 and 49. Thus the trailing finger holder portion 43a and the trailing finger holder portion 43b are at opposite ends of the tubular member over the respective bushings. Thus any uneven loading of the respective holder portions 43a, 43b will be distributed to the two bushings 48, 49 and thus reduce uneven pressures on the respective bushings. Further the tubular member 46 interconnects the two holder portions so that the fingers 26 and 27 act together. Thus the forces applied to one finger for returning it to a crop-material-feeding position will also pivot the other finger to a crop-feeding position. A particular feature of the finger holders is that the cylindrical finger sleeves 53 and 57 are split by the longitudinal space 53a and 57a so that the sleeves may be varied in diameter and tightened against the fingers 27 and 28 by the fastening means 60, 61 formed by the bolts 60a, 61a extending through the plates 51, 52 and 55, 56, respectively, and nuts 60b, 61b. The plates are yieldable to the pressure of the fastening means. The fastening means are tightened to squeeze the respective plates together and close the sleeve against the fingers 27, 28 in a firm clasping relation against dislodgement. The finger plates, sleeves and fastening means form clamping means for securely holding the fingers.

The shaft 22 is supported by collars 65, 66 welded to the intersurface of the vertical portion of the carriage side beams 13, 14, respectively. To prevent rotation of the shaft 22, a pin 66a is mounted in the collar 66 and extends into the shaft 22. The rollers 22a, 22b are rotatably mounted on stud shafts (not shown) fitting into axial bores in the ends of the shaft 22. Thus the trailing shaft 22 supports the trailing end of the carriage and supports the finger holder 43.

The finger plates 51, 52, 55, 56 are of a generally triangular configuration as shown in FIG. 2 and extend downwardly in a parallel relation from the tubular member 46 with the finger sleeves 53, 57 fitted, respectively, therebetween and extending downwardly beyond the ends of the finger plates. The finger plates have projections 51a, 52a and 55a, 56a extending rearwardly with upwardly facing surfaces for engaging the trailing stop beam 17. The trailing stop beam has a right-angle configuration and extends between the side beams 13, 14 and is welded thereto. In a rearward rotation of the fingers to a generally vertical position, the projections engage the trailing stop beam for the proper position of the fingers 27, 28. As illustrated in FIG. 1 the fingers are sloped towards the bale case so that a lift action is imparted to the material as it is carried across the feeder. An L-shaped spring anchor 67 is secured to the trailing stop beam and extends downwardly therefrom. The spring 68 is attached to the spring anchor and to the bolt 60a for pulling the finger back into the vertical position when the fingers 27 and 28 are clear of the crop material in the feeder.

The intermediate finger holder 42 is of similar construction except that the holder portions 42a, 42b are positioned closer together in order to accommodate the side beams 31, 32 of the carriage extension. The shaft 21 is similar to the shaft 22 and is suitably mounted in collars 70, 71 welded to the side beams 13, 14. The carriage beams 31, 32 are pivotally mounted by collars 31a, 32a on the shaft 21. The finger plates 72, 73 have the finger sleeve 74 welded thereto and extending downwardly in an angular relation from the tubular member 69. The finger plates 75, 76 have the finger sleeve 77 also secured thereto and extending downwardly therefrom. The fastening means 78 are identical to fastening means 60, 61 and squeeze the finger sleeves to securely grasp the fingers 25, 26. The finger plates have extensions 72a, 73a, 75a, 76a extending rearwardly to engage the intermediate stop beam 15 to set the fingers 25, 26 in the proper crop-engaging position. The intermediate stop beam has two spring anchors 82, 83 for connecting one or two springs 84 between the intermediate stop beam 15 and the holder 42 for returning the fingers 25, 26 to the generally vertical position.

The leading tines 23, 24 are adjustably mounted in the leading feeder holder 41 which is substantially the same as the other finger holders 42, 43. The tubular member 92 is pivotally mounted on the shaft 33 which supported in the beams 31, 32 by collars 93, 94 with the collar 93 being fixed to the shaft to prevent relative rotation. The finger holder plates 95, 96, 97, 98 have a generally rectangular configuration and are welded to the tubular member 92 in parallel relation with the finger plates 95, 96 carrying the finger sleeve 100 therebetween and forwardly of the tubular member 92 so that the finger 23 may extend beyond the upper end of the finger sleeve for a wider range of adjustment than the finger sleeves of the holders 42, 43. The finger sleeve 101 is similarly mounted between the plates 97, 98. Fastening means 105 and 106, respectively, pass through the plates 95, 96 to compress the sleeve 100 against the finger 23 and the plates 97, 98 to compress the sleeve 101 against the finger 24. The arc of rotation of the fingers 23, 24 is limited by the extensions 95a, 96a, 97a, 98a on the respective plates engaging the leading stop beam 40 welded to the extension side beams 31, 32. The stops 95b, 96b, 97b, 98b above the leading stop beam limit the forward movement of the fingers 23, 24 to prevent interference with the bale case. Thus the holder 41 has a limited arc of movement. The leading stop beam 40 also supports two spring anchors 110, 111. The one or two springs (not shown) may be connected to the holder 41 and to a respective spring anchor for urging the fingers to a generally vertical position.

The platelike members, sleeves and fastening means form a mounting means for attaching the feeder fingers to the tubular member. The sleeves are feeder finger encompassing means which are variable in size in response to pressure of the fastening means for firmly gripping the feeder fingers. A particular feature of the feeder fingers is the pointed conical tips 23a, 24a, 25a, 26a, 27a, 28a, respectively. These tips provide a more aggressive action in engaging the crops and carrying the crops into the bale case.

The finger holders of this invention present many features and advantages over prior finger holders. A primary feature is the higher reliability of the finger holders to rotate on the supporting shafts to return the fingers to the crop-engaging position. This increased reliability has been attained by reducing the wear of the holders on the shaft and greatly improving the lubrication of the bushings supporting the holder on the shaft and the prevention of foreign debris from entering between the bearing surfaces to destroy the lubricant and prevent further lubrication of the bearing surfaces.

The finger holders also provide a firmer grasp of the fingers and retention in position than in prior designs. This has been attained with a reduction in the cost of manufacture and in the weight of the finger holder. Both of these latter features are important. The reduction in the weight reduces the overall weight of the reciprocating carriage and, therefore, the amount of mass which has to be changed on each stroke. The improved clamp of the fingers also has improved the length of life of the finger holder by greatly reducing the breakage of the holder in engaging the stop beams. The two finger plates distribute the impact and are substantially stronger than the cast projections of the previous finger holders. As to the cost of manufacture the parts may be made from sheet metal and simply manufactured in accordance with sheet metal techniques.

While this invention has been described in connection with a single embodiment, it will be understood that this embodiment is capable of modification and that this application is intended to cover any variations, uses, or adaptations following, in general, the principles of the invention and including such departures from the present disclosure as come within known or customary practice in the aft to which the invention pertains, and as fall within the scope of the invention or the limits of the appended claims.

I claim:

1. A baler feeder finger holder rotatably mounted on a shaft of a feeder carriage reciprocating in feed and return strokes and supporting two feeder fingers in a generally vertical position on the feed stroke and in a raised position on a crop-engaging return stroke comprising:
   a tubular member having portions at opposite ends holding bushings rotatably mounted on said shaft, said bushings spacing said tubular member from said shaft to form an annular passage between said bushings,
   means for providing lubricant to said passage and thereby to said bushings,
   two pair of side-by-side platelike members fixedly mounted on said portions of said tubular member in transverse relation to said tubular member,
   two radially resilient tubular sleeves mounted between said platelike members of said respective pairs,
   fastening means attached to said platelike members to force said tubular sleeves in firm gripping relation with said respective fingers while said bushings maintain a lubricated rotatable relation with said shaft as said fingers swing and move with said carriage on feed and return strokes.

2. A baler feeder finger holder as set forth in claim 1 wherein said platelike members extend from said tubular member, said sleeves between said respective pairs of plates and offset from said tubular member so the mounted ends of said fingers extend clear of said tubular member.

3. A baler feeder finger holder as set forth in claim 2 wherein said attaching means is on the other side of said respective sleeves from said tubular member.

4. A baler feeder finger holder as set forth in claim 2 wherein said platelike members each have two projections on the opposite side of said tubular member from said respective sleeves and spaced from one another to position said feeder fingers generally vertically on a feed stroke and to limit the raised position on a crop-engaging return stroke.

5. A baler feeder finger holder as set forth in claim 1 wherein said sleeves extend generally radially to said tubular member and said platelike members have projections also extending radially and spaced from said respective sleeves for engaging stop means to position said feeder fingers generally vertically on a feed stroke.

6. A baler feeder finger holder as set forth in claim 5 wherein said fastening means are between said respective sleeves and said respective projections.

7. A baler feeder finger holder rotatably mounted on a shaft of a feeder carriage reciprocating in feed and return strokes and supporting two feeder fingers in a generally vertical position on the feed stroke and a raised position on a crop-engaging return stroke comprising:
   a tubular member having portions at opposite ends for holding bushings, bushings mounted in said portions rotatably mounting said tubular member on said shaft and spacing said tubular member from said shaft to form an annular passage between said bushings,
   means for providing lubricant to said passage and thereby to said bushings,
   two feeder fingers,
   two mounting means each comprising platelike means, finger encompassing means and fastening means, said platelike means fixedly secured to said respective portions of said tubular member and extending therefrom and said finger-encompassing means mounted on said platelike means and variable in size to grip said respective fingers, and said fastening means attached to said platelike means and pressing said finger-encompassing means in tight gripping relation with said respective fingers, and
   said tubular member rotating about said shaft for swinging said fingers between a generally vertical position and a raised position while lubricant is available to said bushings from said passage for maintaining a rotatable relation between said holder and said shaft.

8. A baler feeder finger holder rotatably mounted on a shaft of a feeder carriage reciprocating in feed and return strokes and supporting two feeder fingers in a generally vertical position on the feed stroke and a raised position on a crop-engaging return stroke comprising:
   a tubular member having portions at opposite ends for holding bushings, bushings mounted in said portions rotatably mounting said tubular member on said shaft and spacing said tubular member from said shaft to form an annular passage between said bushings,
   means for providing lubricant to said passage and thereby to said bushings,
   two feeder fingers,
   two mounting means comprising two pairs of platelike members fixedly secured to said tubular member at said respective portions and extending therefrom two sleevelike means respectively mounted between said platelike members of said respective pairs for receiving said feeder fingers and fastening means attached to said platelike members and pressing said sleevelike means in firm gripping relation with said respective feeder fingers, and
   said tubular member rotating about said shaft for swinging said fingers between a generally vertical position and a raised position while lubricant is available to said bushings from said passage for maintaining a rotatable relation between said holder and said shaft.

9. A baler feeder finger holder comprising a tubular member for rotatably mounting said holder on a shaft of an infeed carriage, two platelike members on said tubular member in spaced side-by-side, parallel relation and extending generally radially to said tubular member, finger-encompassing means mounted between and on said platelike members and variable in size to grip a feeder finger inserted therein, fastening means attached to said platelike members for pressing said members towards one another and compressing said finger-encompassing means to firmly grasp a finger therein.

10. A baler feeder finger holder as set forth in claim 9 wherein said finger-encompassing means is a radially resilient, tubular sleeve.

11. A baler feeder finger holder as set forth in claim 9 wherein said first platelike members are adjacent one end of said tubular member and two second platelike members are provided welded to said tubular member at the other end.

12. A baler feeder finger holder rotatably mounted on a shaft of a feeder carriage reciprocating in feed and return strokes and supporting a plurality of feeder fingers in a generally vertical position on the feed stroke and in a raised position on a crop-engaging return stroke comprising:
   a tubular member rotatably mounted on said shaft,
   a plurality of pairs of side-by-side platelike members fixedly mounted on said tubular member in transverse relation to said tubular member,
   a plurality of radially resilient tubular sleeves mounted between said platelike members of a respective pair,
   fastening means attached to said platelike members to force said tubular sleeves in firm gripping relation with said respective fingers while said tubular member maintains a rotatable relation with said shaft as said fingers swing and move with said carriage on feed and return strokes.

13. A baler feeder finger holder rotatably mounted on a shaft of a feeder carriage reciprocating in feed and return strokes and supporting a plurality of feeder fingers in a generally vertical position on the feed stroke and in a raised position on a crop-engaging return stroke comprising:
- a tubular member rotatably mounted on said shaft of said feeder carriage,
- a plurality of spaced platelike means fixedly mounted on said tubular member in transverse relation to said tubular member,
- a plurality of resilient finger encompassing means mounted on said respective platelike means,
- fastening means attached to said respective platelike means for compressing said respective finger-encompassing means to firmly grasp said respective feeder fingers mounted in said respective finger-encompassing means.

* * * * *